United States Patent Office 3,184,512
Patented May 18, 1965

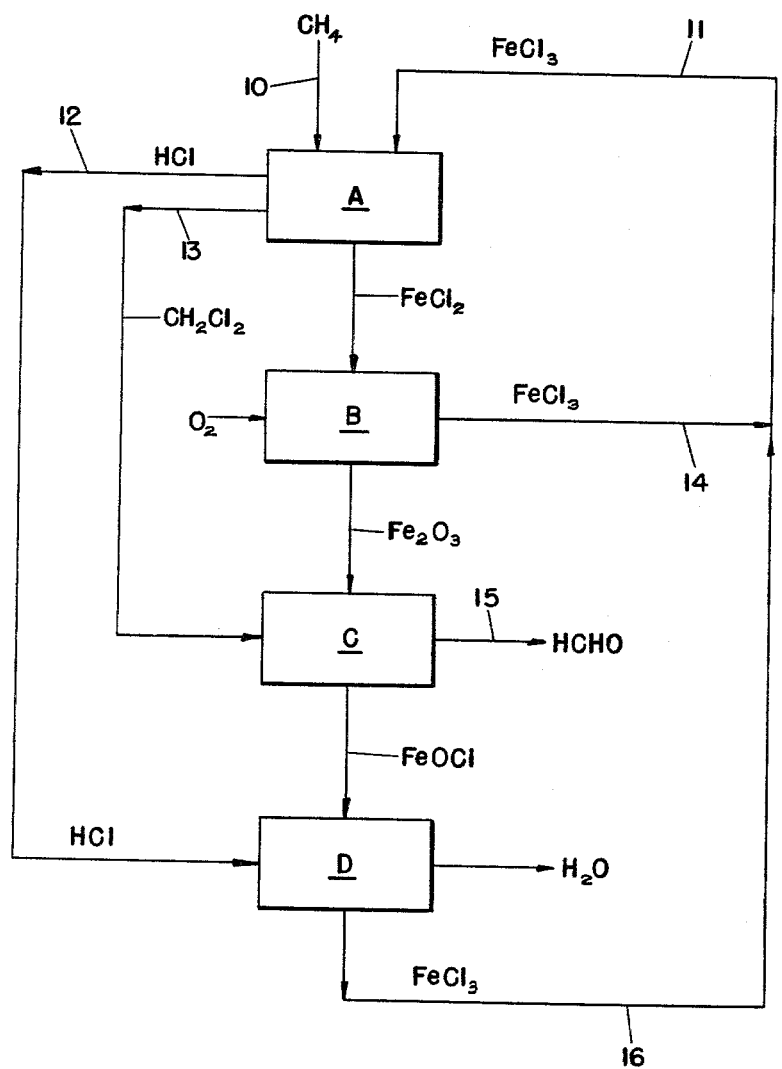

3,184,512
PREPARATION OF FORMALDEHYDE
Edgar Allan Blair, Drexel Hill, Pa., assignor to Sun Oil Company, Philadelphia, Pa., a corporation of New Jersey
Filed Oct. 28, 1960, Ser. No. 65,804
3 Claims. (Cl. 260—604)

This invention relates to the preparation of formaldehyde from methane by first converting the methane to methylene chloride and then converting the latter to formaldehyde in an integrated cyclic process.

According to the invention, methane is reacted with ferric chloride under certain conditions to form methylene chloride ($CH_2Cl_2$) and hydrogen chloride while converting the ferric chloride to ferrous chloride. The latter is contacted with oxygen to produce a mixture of ferric chloride and ferric oxide. The ferric chloride is vaporized from the oxide and re-used in the chlorination step. The methylene chloride is contacted with the ferric oxide at elevated temperature to yield formaldehyde while converting the ferric oxide to a basic ferric chloride. The latter is contacted with the hydrogen chloride derived from the chlorination step to form ferric chloride which is then re-used in the chlorination step.

The reactions in the various steps of the process can be illustrated by the following equations:

(1) $CH_4 + 4FeCl_3 \rightarrow CH_2Cl_2 + 4FeCl_2 + 2HCl$
(2) $12FeCl_2 + 3O_2 \rightarrow 8FeCl_3 + 2Fe_2O_3$
(3) $Fe_2O_3 + CH_2Cl_2 \rightarrow HCHO + 2FeOCl$
(4) $FeOCl + 2HCl \rightarrow FeCl_3 + H_2O$ From these equations it can be seen that formaldehyde is produced without any consumption of chlorine in the process, as the HCl released in the chlorination reaction is used to reform $FeCl_3$ which is recycled.

The invention is more specifically described in conjunction with the accompanying drawing which schematically illustrates the process.

Referring to the drawing, the chlorination step is carried out in reaction zone A. The methane feed from line 10 is contacted with ferric chloride from recycle line 11 at a temperature in the range of 220–375° C., more preferably 250–360° C. The ferric chloride can be in a solid, liquid or vapor form but preferably is in vapor state at a temperature above its normal boiling point (315° C.). It is important for obtaining the best yield of methylene chloride to maintain a molar ratio of ferric chloride to methane fed to zone A in a range of 0.25:1 to 3.0:1. At ratios less than 0.25 large amounts of methyl chloride are formed, while ratios above 3 tend to produce carbon tetrachloride in large yield. Substantial yields of methylene chloride are obtained at ratios in the specified range, although the other three chloromethanes generally are also produced in various amounts. Typical product compositions for two different ferric chloride to methane molar ratios at a reaction temperature of 355° C. and a residence time in zone A of 1.25 hours are as follows:

| $FeCl_3$:$CH_4$ Ratio | $CH_3Cl$, percent | $CH_2Cl_2$, percent | $CHCl_3$, percent | $CCl_4$, percent |
|---|---|---|---|---|
| 0.34 | 52 | 35 | 13 | |
| 1.90 | 30 | 28 | 27 | 15 |

From the reaction product of zone A HCl and methylene chloride are separately recovered as indicated by lines 12 and 13, respectively. The other chloromethanes generally will also be separately recovered and used for other purposes.

In the chlorination reaction in zone A the ferric chloride is reduced to ferrous chloride. The latter is contacted with a free oxygen-containing gas such as air, as indicated by zone B. This converts the iron compound to a mixture of $Fe_2O_3$ and $FeCl_3$, the latter being vaporized from the oxide and recycled through lines 14 and 11 to zone A. The ferric oxide is then contacted in zone C with the methylene chloride from line 13 at a temperature in the range of 220–375° C., more preferably 250–360° C., to roduce the desired formaldehyde product as indicated by line 15. During this reaction the ferric oxide is converted to a basic chloride believed to correspond to FeOCl although this is not known with certainty. In any event by contacting the basic ferric chloride with HCl from line 12, as indicated at zone D, it is reconverted to ferric chloride which is recycled via lines 16 and 11 to zone A. Water is formed as a by-product of the reaction.

From the foregoing description it can be seen that the present process permits the production of formaldehyde in an inexpensive manner, with methane and air being the only materials consumed. While in the preceding description the halogen of the iron compounds has been limited to chlorine, the process can also be practiced employing ferric bromide as the halogenating reagent and hence the bromide should be considered as equivalent to the chloride for the present purpose.

I claim:
1. Method of preparing formaldehyde which comprises contacting methane with a ferric halide selected from the group consisting of ferric chloride and ferric bromide at a temperature in the range of 220–375° C. and with a ferric halide:methane molar ratio of 0.25:1 to 3.0:1, whereby halogenation of the methane occurs and the ferric halide is reduced to ferrous halide, separately recovering methylene halide and hydrogen halide from the reaction mixture, contacting the ferrous halide with oxygen to form ferric oxide and ferric halide, vaporizing the ferric halide from the oxide and returning the ferric halide to the halogenation step, contacting the ferric oxide at a temperature in the range of 220–375° C. with the methylene halide to yield formaldehyde while converting the ferric oxide to a basic ferric halide, contacting the basic ferric halide with the hydrogen halide recovered from said halogenation step to form ferric halide, and re-using the ferric halide in the halogenation step.

2. Method according to claim 1 wherein each of said temperature ranges are 250–360° C.

3. Method according to claim 1 wherein the ferric halide is ferric chloride.

References Cited by the Examiner
UNITED STATES PATENTS

| | | | |
|---|---|---|---|
| 1,566,819 | 12/25 | Carter | 260—606 |
| 1,616,533 | 2/27 | Krause et al. | 260—606 |
| 1,679,673 | 8/28 | Krause et al. | 260—606 |
| 1,917,231 | 7/33 | Bacon et al. | 23—87 |
| 2,677,598 | 5/54 | Crummett et al. | 23—87 |
| 2,752,223 | 6/56 | Reeve | 23—87 |

OTHER REFERENCES
Fells et al.: Jour. Chem. Society (1958), pages 1326–1333.
Huntress: Organic Chlorine Compounds (1948), 525, 930, 931.

LEON ZITVER, Primary Examiner.
CHARLES B. PARKER, Examiner.